(12) United States Patent
Zhou et al.

(10) Patent No.: US 7,864,667 B2
(45) Date of Patent: Jan. 4, 2011

(54) ONE-GOOD-PAIR OPERATION IN DUAL-PAIR MODE

(75) Inventors: Xinkuan Zhou, Eden Prairie, MN (US); Clifton Powers, Raleigh, NC (US); Laxman Anne, Eden Prairie, MN (US); Manish Sharma, Eden Prairie, MN (US); Joe Polland, Eden Prairie, MN (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 325 days.

(21) Appl. No.: 12/045,368

(22) Filed: Mar. 10, 2008

(65) Prior Publication Data

US 2009/0092149 A1 Apr. 9, 2009

Related U.S. Application Data

(60) Provisional application No. 60/978,370, filed on Oct. 8, 2007.

(51) Int. Cl.
*G06F 11/00* (2006.01)
*G06F 11/20* (2006.01)
*H04L 12/66* (2006.01)

(52) U.S. Cl. .................... 370/217; 370/360; 370/463; 714/25

(58) Field of Classification Search ......... 370/201–228, 370/351–389, 410–488; 709/218–239; 714/25, 714/27, E11.071
See application file for complete search history.

(56) References Cited

U.S. PATENT DOCUMENTS

| 5,878,221 | A  | * | 3/1999  | Szkopek et al. ............ 709/218 |
| 2003/0095502 | A1 |   | 5/2003  | Glaser et al. |
| 2006/0233188 | A1 | * | 10/2006 | Oliver et al. ............... 370/442 |
| 2006/0291500 | A1 |   | 12/2006 | Kroninger et al. |

FOREIGN PATENT DOCUMENTS

EP 1009154 * 6/2000

OTHER PUBLICATIONS

International Searching Authority, "International Search Report", Feb. 19, 2009, Published in: WO.

\* cited by examiner

*Primary Examiner*—Afsar M. Qureshi
(74) *Attorney, Agent, or Firm*—Fogg & Powers LLC

(57) ABSTRACT

A communication system comprising at least one communication unit. Each communication unit includes an interface port, a first-digital-subscriber-line port, a second-digital-subscriber-line port, and a central processing unit. The central processing unit is communicatively coupled to receive information indicative of the operability of the first-digital-subscriber-line port and the second-digital-subscriber-line port. The at least one communication unit is implemented on the physical layer in single-pair mode. The at least one communication unit is configured to switch from sending timeslots in dual-pair mode to sending timeslots in 1+1 protection mode when communication on one of the first-digital-subscriber-line port and the second-digital-subscriber-line port fails.

27 Claims, 6 Drawing Sheets

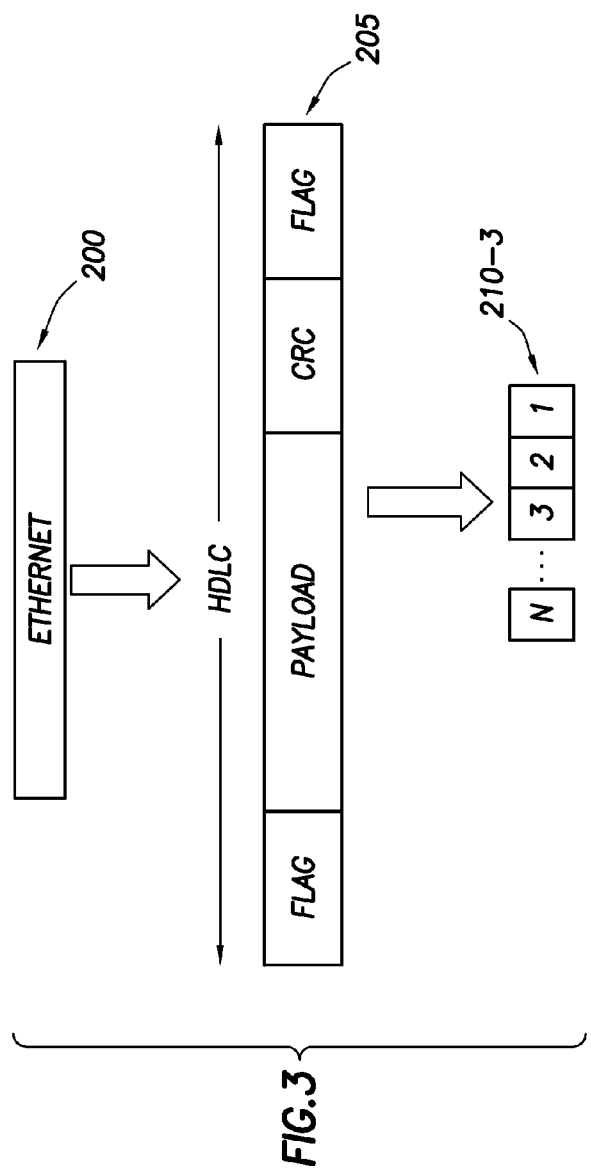
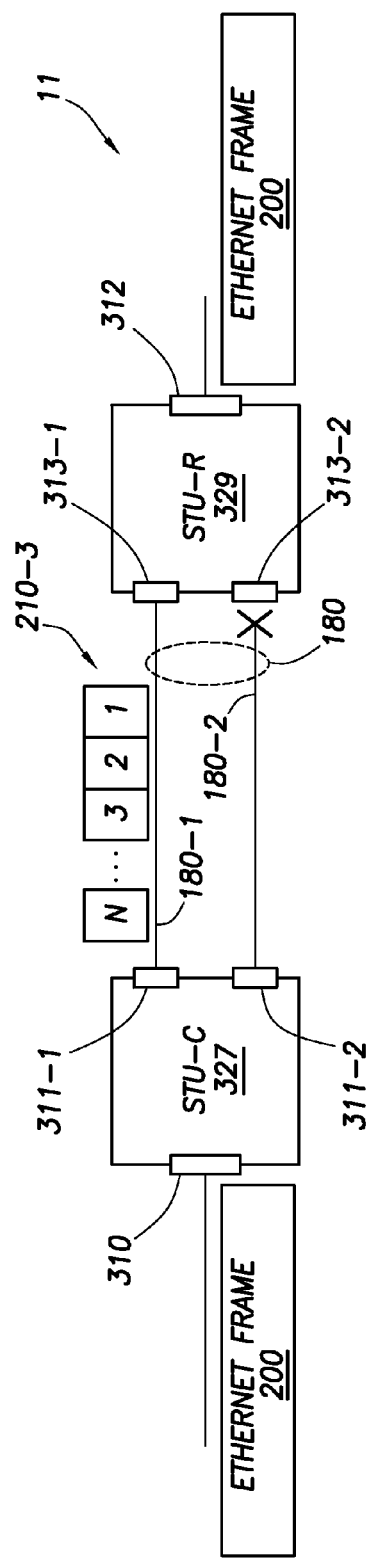
FIG.3
FIG.6

ONE-GOOD-PAIR OPERATION IN DUAL-PAIR MODE

CROSS REFERENCE TO RELATED APPLICATIONS

This application claims the benefit of U.S. Provisional Application No. 60/978,370, filed on Oct. 8, 2007, which is incorporated herein by reference in its entirety.

BACKGROUND

Ethernet traffic is sent across G.SHDSL interfaces in dual-pair mode (M-pair mode where M=2). The term G.SHDSL refers to selectable one/two-pair high speed digital subscriber lines (SHDSL) that conform to ITU-T recommendation G.991-2. The Ethernet frames are sent and received on the Ethernet port on a central SHDSL transceiver unit (STU-C) and on a remote SHDSL transceiver unit (STU-R).

Typically, Ethernet frames received at the STU-C and the STU-R are converted to a High-Level Data Link Control (HDLC) format, which is inserted into a DS0 based pulse-code modulated (PCM) stream. This stream is distributed between the DSL pairs in a sequential manner. For example, timeslot 1 is inserted in timeslot 1 of DSL pair 1 and timeslot 2 is inserted in timeslot 1 DSL pair 2, and so on. Thus, if a line in pair 1 or pair 2 fails, the Ethernet connection is lost, because the half of the data is sent over the broken line and is not received at the STU-R.

There is a need in the art for a method and system to send Ethernet frames over a pair of digital subscriber lines even when one of the lines in the pair of digital subscriber lines is faulty and/or broken.

SUMMARY

In one aspect, the present application discloses a communication system comprising at least one communication unit. Each communication unit includes an interface port, a first-digital-subscriber-line port, a second-digital-subscriber-line port, and a central processing unit. The central processing unit is communicatively coupled to receive information indicative of the operability of the first-digital-subscriber-line port and the second-digital-subscriber-line port. The at least one communication unit is implemented on the physical layer in single-pair mode. The at least one communication unit is configured to switch from sending timeslots in dual-pair mode to sending timeslots in 1+1 protection mode when communication on one of the first-digital-subscriber-line port and the second-digital-subscriber-line port fails.

In another aspect, the present application discloses a method to protect Ethernet data on a digital subscriber line system. The method includes switching from dual-pair-mode-time-slot mapping to 1+1 time-slot mapping when a fault is detected on a line in a pair of digital subscriber lines and switching from 1+1 time-slot mapping to dual-pair-mode-time-slot mapping when the fault is corrected.

In yet another aspect, the present application discloses a method to protect Ethernet data on a digital subscriber line system. The method includes mapping timeslots according to a dual-pair-mode-time-slot mapping when the lines in the digital subscriber line system are operable, switching from dual-pair-mode-time-slot mapping to 1+1 mapping when one of the lines in the pair of digital subscriber lines is determined to be inoperable, and mapping timeslots according to a 1+1 pair mapping when one of the lines in the pair of digital subscriber lines is inoperable.

In yet another aspect, the present application discloses a communication unit comprising at least one interface port configured to send and receive Ethernet frames, a first G.SHDSL port communicatively coupled to a first line in a pair of digital subscriber lines, a second G.SHDSL port communicatively coupled to a second line in a pair of digital subscriber lines, a first G.SHDSL chipset configured to monitor the first G.SHDSL port, and a second G.SHDSL chipset configured to monitor the second G.SHDSL port. The communication unit operates on the physical layer in single-pair mode so that Ethernet data is not lost when one of the first G.SHDSL port and the second G.SHDSL port is inoperable.

DRAWINGS

FIG. 3 is a block diagram depicting an embodiment of the conversion of the Ethernet frame.

FIG. 6 is a block diagram of a communication system operating in 1+1 mode sending Ethernet traffic across interfaces in accordance with one embodiment of the present invention.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
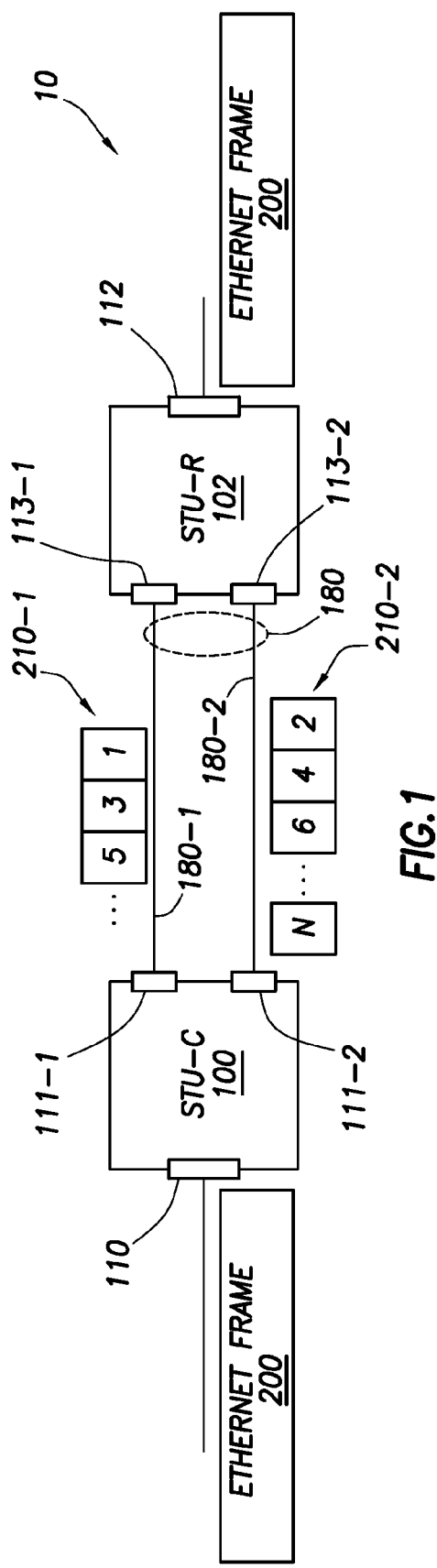
FIG. 1 is a block diagram of a communication system operating in dual-pair mode sending Ethernet traffic across interfaces in accordance with one embodiment of the present invention.

FIG. 1 is a block diagram of a communication system 10 operating in dual-pair mode sending Ethernet traffic across interfaces in accordance with one embodiment of the present invention. The "communication system 10" is also referred to herein as "digital subscriber line system 10." The communication system 10 in this embodiment includes two communication units 100 and 102 that each include at least one interface port, a first-digital-subscriber-line port, and a second-digital-subscriber-line port. As shown in FIG. 1, the first communication unit 100 is a central SHDSL transceiver unit (STU-C) 100 and the second communication unit 102 is a remote SHDSL transceiver unit (STU-R) 102. The STU-C 100 includes interface port 110, first-digital-subscriber-line port 111-1 (also referred to herein as first DSL port 111-1), and second-digital-subscriber-line port 111-2 (also referred to herein as second DSL port 111-2). The STU-R 102 includes interface port 112, first DSL port 113-1, and second DSL port 113-2. The interface ports 110, and 112, the first DSL ports 111-1 and 113-1, and the second DSL ports 111-2 and 113-2 are each structured to send and receive Ethernet data.

The first DSL port 111-1 is communicatively coupled to the first DSL port 113-1 via a digital subscriber line 180-1. Likewise, second DSL port 111-2 is communicatively coupled to the second DSL port 113-2 via a digital subscriber line 180-2. "Digital subscriber line 180-1" is also referred to herein as "line 180-1" and "pair 180-1," while "digital subscriber line 180-2" is also referred to herein as "line 180-2" and "pair 180-2." The digital subscriber lines 180-1 and 180-2 are also referred to in the art as DSL loops, single-pairs, line, and pairs. The digital subscriber line 180-1 and digital subscriber line 180-2 form a pair of digital subscriber lines 180. Communication on a port (such as, first DSL port 111-1) fails when the port itself fails, when a communicatively coupled digital subscriber line (such as digital subscriber line 180-1) breaks or otherwise fails, and/or when a communicatively coupled port (such as, first DSL port 113-1) fails. In any of these cases, the port is a faulty or failed port and the line is a faulty or failed line, since communication via that port and line is not possible until the fault or break is repaired.

When an Ethernet frame 200 is received at the interface port 110, the STU-C 100 encapsulates the Ethernet frame into an HDLC frame, then segments the HDLC frame segments the Ethernet frame 200 into timeslots, which are alternately distributed between the digital subscriber line 180-1 and digital subscriber line 180-2 when the DSL loops 180-1 and 180-2 are both operational. Exemplary timeslots are indicted as numbered blocks 1, 2, 3, . . . , N. Every-other-one of the timeslots (e.g., 1, 3, 5, 7, . . . , N) represented generally by the numeral 210-1 is output from the first DSL port 111-1 to the digital subscriber line 180-1. The alternate ones of the every-other timeslots (e.g., 2, 4, 6, 8 . . . (N+1)) represented generally by the numeral 210-2 are output from the second DSL port 111-2 to the digital subscriber line 180-2. The timeslots 210-1 and 210-2 are received at the first DSL port 113-1 and second DSL port 113-2, respectively. The STU-R 102 interleaves the alternately distributed timeslots 210-1 and 210-2 and forms the Ethernet frame 200, which is sent from the interface port 112. If an Ethernet frame 200 is received at the interface port 112 of the STU-R 102, this process is reversed, since both the STU-C 100 and the STU-R 102 are configured to send and receive Ethernet frames 200.

As described above, if either of the digital subscriber lines 180-1 or 180-2 fails in the prior art communication system, the Ethernet connection is lost, because the half of the data sent over the faulty line and is not received at the STU-R. However, the communication system 10 protects against this loss by switching from dual-pair mode to 1+1 protection mode if one of the DSL loops 180-1 or 180-2 fails.

When the application layer recognizes that the STU-C 100 and STU-R 102 are operating in dual-pair mode, communication system 10 operates on the physical layer in single-pair mode. The communication system 10 implements maps in the STU-C 100 and STU-R 102 to direct the timeslots while the physical layer is operating in single-pair mode. When both lines in the pair of digital subscriber lines 180 are operable, the STU-C 100 (or STU-R 102) implements a dual-pair-mode-time-slot mapping. The dual-pair-mode-time-slot mapping sends the timeslots so that every-other timeslot 210-1 is output from the first DSL port 111-1 to the digital subscriber line 180-1 while alternate ones of the every-other timeslots 210-2 are output from the second DSL port 111-2 to the digital subscriber line 180-2. When the communication system 10 is implemented in this manner, the communication system 10 is defined to be "operating in dual-pair mode" while the physical layer is operating in single-pair mode.

Figure 2:
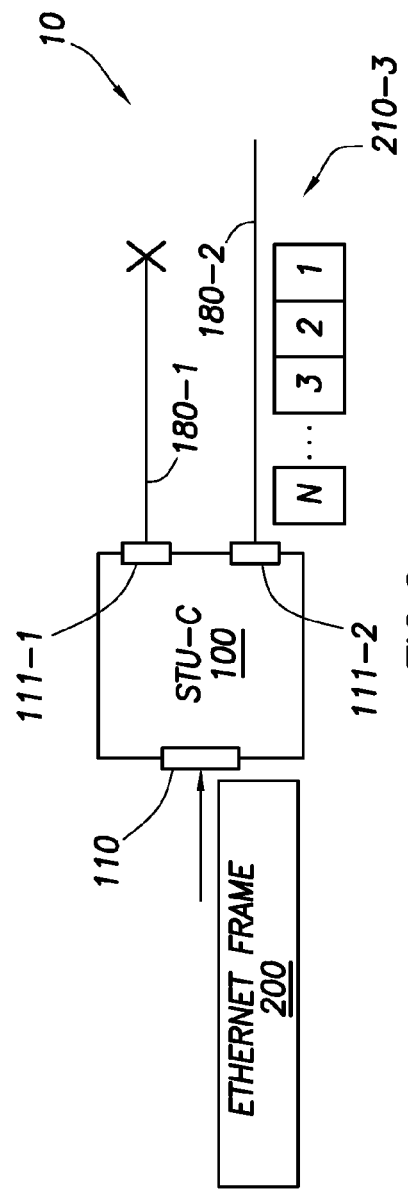
FIG. 2 is a block diagram of a communication unit sending Ethernet traffic across interfaces in 1+1 mode after a fault is detected in a line in the pair of digital subscriber lines in accordance with one embodiment of the present invention.

When a fault is detected on a line 180-1 or 180-2 in the pair of digital subscriber lines 180, the communication unit 100 switches from dual-pair-mode-time-slot mapping to 1+1 time-slot mapping. FIG. 2 is a block diagram of a communication unit 100 for sending Ethernet traffic across interfaces in 1+1 mode after a fault is detected in the line 180-1 in the pair of digital subscriber lines 180. The 1+1 time-slot mapping operates to send all the timeslots in 210-3 on the operational digital subscriber line (such as digital subscriber line 180-2). By switching to 1+1 protection mode when one of the digital subscriber lines 180-1 and 180-2 fails, all the timeslots 210-3 are duplicated on both digital subscriber lines 180-1 and 180-2 so the operational link still delivers all the data. The timeslots 210-3 sent on the non-operable link are lost.

When the fault on the non-operational digital subscriber line 180-$i$ is corrected, the communication unit 100 switches from 1+1 time-slot mapping to dual-pair-mode-time-slot mapping. In this manner, the timeslots are mapped to the digital subscriber lines 180-1 and/or 180-2 depending on the operability of the digital subscriber lines 180-1 and 180-2.

In one implementation of this embodiment, when the dual-pair-mode-time-slot mapping is implemented by the communication system 10, the data rate may be up to 11.92 Mbits/sec (178 timeslots). In this case, when the communication system 10 switches to implementing the 1+1 time-slot mapping, the data rate may be up to 5.96 Mbits/sec (89 timeslots). Upon recovery of the failed digital subscriber line, the communication system 10 switches back to dual-pair mode restoring the original data rate of up to 11.92 Mbits/sec.

In one implementation of this embodiment, the data rate on a single operable digital subscriber line is increased depending on the bandwidth available on the digital subscriber line. In one such implementation, the communication system 10 data rate remains the same when the communication system 10 switches to 1+1 protection mode. In another such implementation, the communication system 10 data rate is greater than half the original communication system data rate when the communication system 10 switches to 1+1 protection mode.

A failure in one of the DSL ports 111 or 113 occurs when there is a loss of synchronization or when loop attenuation margins limits are exceeded. In one implementation of this embodiment, communication on the first DSL port 111-1 fails if there is a break in the line 180-1. In another implementation of this embodiment, communication on the second DSL port 111-2 fails when there is a break in the line 180-2. If one of the first DSL port 111-1, the digital subscriber line 180-1, or the first DSL port 113-1 fails, the communication on the first DSL port 111-1 fails. Likewise, if one of the second DSL port 111-2, the digital subscriber line 180-2, or the second DSL port 113-2 fails, the communication on the second DSL port 111-2 fails.

Embodiments of the present invention offer enhanced Ethernet support. In one implementation of this embodiment, DSL SHDSL equipment conforms to the ITU Recommendation G.991.2, also known as G.SHDSL. G.SHDSL specifies operation via one pair of digital subscriber lines (DSL). The term G.SHDSL refers to selectable one/two-pair high speed digital subscriber lines (SHDSL) that conform to ITU-T recommendation G.991-2. Typically, Ethernet traffic is sent across G.SHDSL interfaces in dual-pair mode (M-pair mode where M=2).

In some embodiments, Ethernet frames received at the STU-C and the STU-R are converted to HDLC format, which is inserted into a DS0 based pulse-code modulated (PCM) stream. FIG. 3 is a block diagram depicting an embodiment of the conversion of the Ethernet frame 200. The HDLC format 205 includes a start flag, cyclic redundancy check (CRC), a payload, and an end flag. The payload and CRC are segmented into the timeslots indicated as blocks numerically labeled from 1 through N and represented generally by the numeral 210-3.

Figure 4:
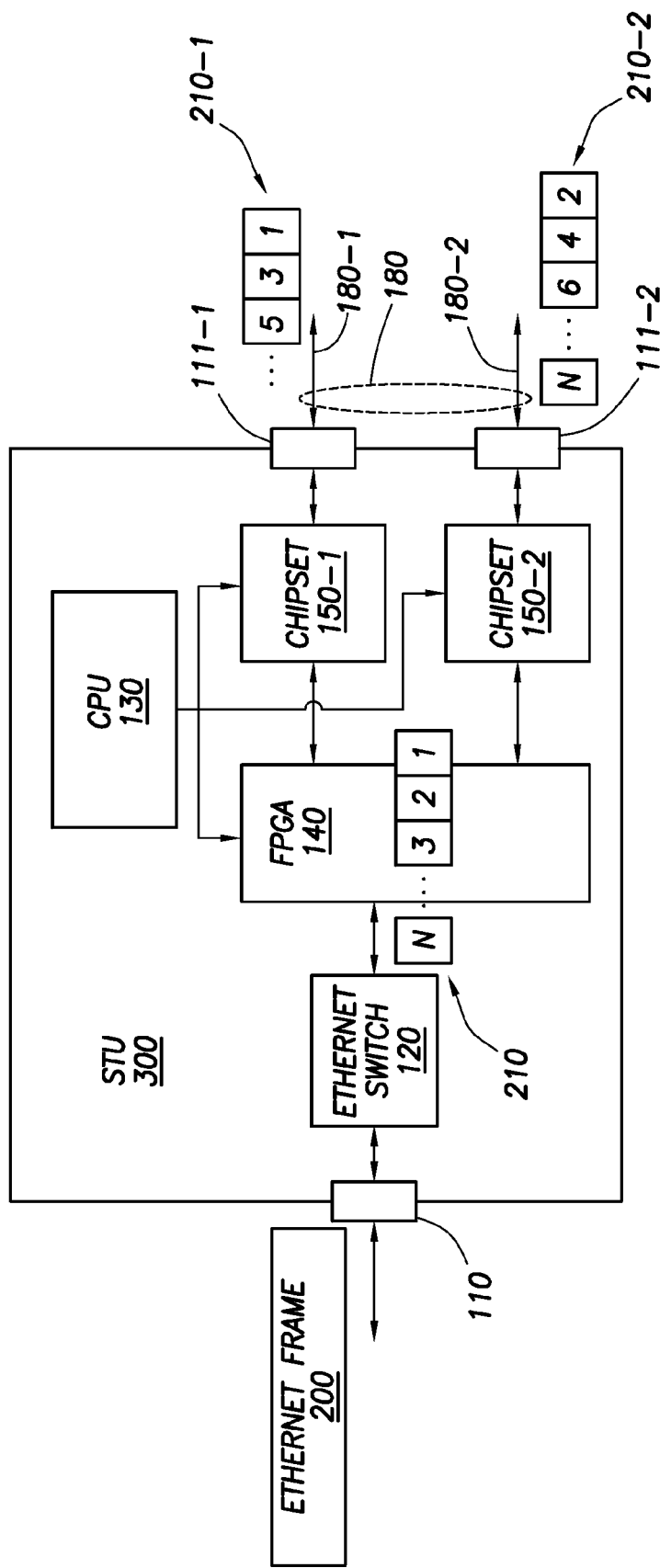
FIGS. 4 and 5 are block diagrams of communication units sending timeslots in dual-pair mode while the communication units operate on the physical level in single pair mode in accordance with one embodiment of the present invention.
Figure 5:
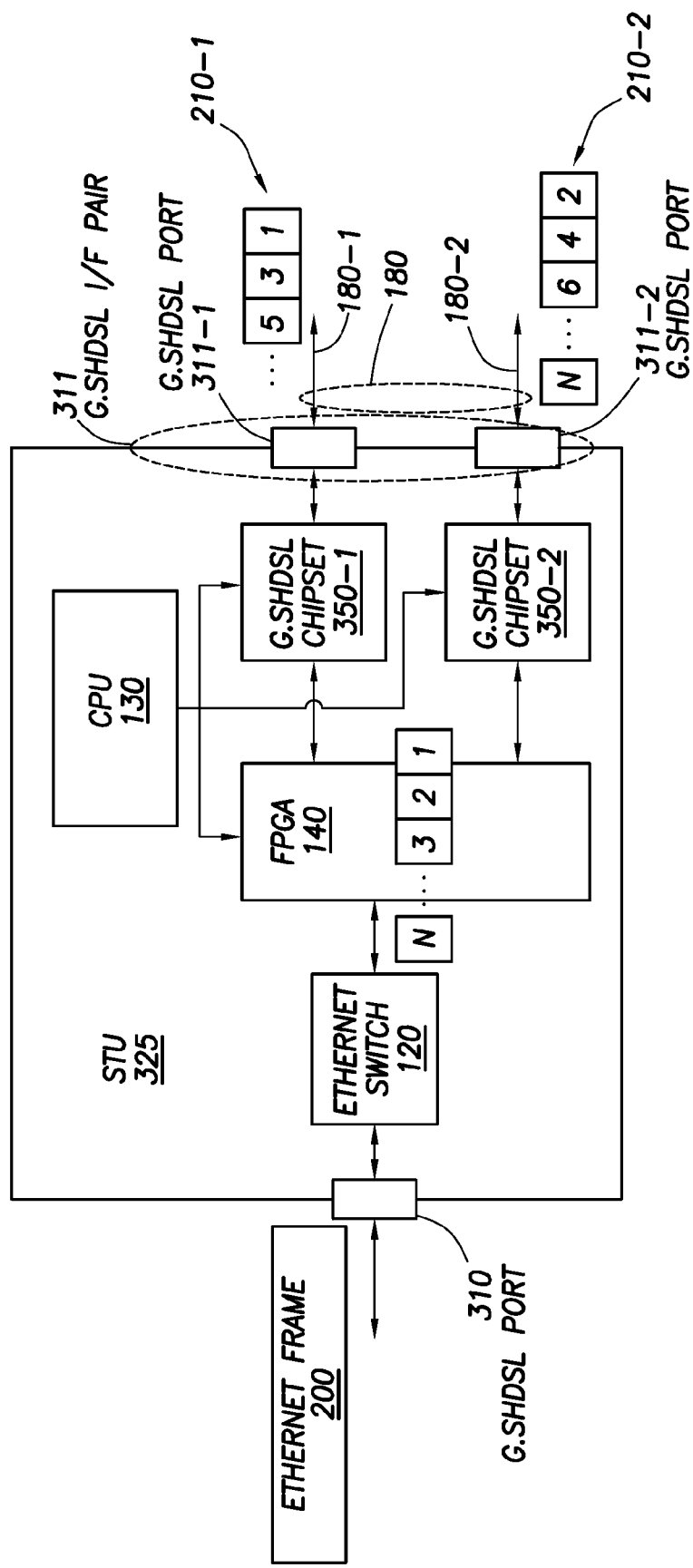

FIGS. 4 and 5 are block diagrams of communication units sending timeslots in dual-pair mode while the communication units operate on the physical level in single pair mode in accordance with one embodiment of the present invention. FIG. 4 is a block diagram of a communication unit 300 sending timeslots in dual-pair mode while the communication units operate on the physical level in single pair mode in accordance with one embodiment of the present invention. The communication unit 300 is also referred to herein as STU 300. The STU 300 is representative of a remote STU (STU-R) and a central STU (STU-C) that is operating on the physical layer in single mode operation. The communication unit 300 includes an Ethernet switch 120, the field programmable gate array (FPGA) 140, a central processing unit 130, and two chipsets 150-1 and 150-2. The Ethernet switch 120 is communicatively coupled to the interface port 110. The Ethernet switch 120 segments the Ethernet frame 200 into the plurality of timeslots (1-N) represented generally by the numeral 210. The field programmable gate array 140 is communicatively coupled to receive the timeslots 210 from the Ethernet switch 120. The field programmable gate array 140 directs each timeslot to one of the first DSL port 111-1 and the second DSL port 111-2 based on the operability of the first DSL port 111-1 and the second DSL port 111-2. In one implementation of this embodiment, the Ethernet switch 120 is coupled to the field programmable gate array (FPGA) 140 via a time division multiplexing (TDM) interface. In another implementation of this embodiment, the TDM interface is a PCM interface. In another implementation of this embodiment, the TDM interfaces between the FPGA and chipsets 150-1 and 150-2 are PCM interfaces. Other types of interfaces are possible.

The central processing unit 130 receives information indicative of the operability of the first-digital-subscriber-line port 111-1 from the first chipset 150-1. The central processing unit 130 also receives information indicative of the operability of the second-digital-subscriber-line port 111-2 from the second chipset 150-2. The central processing unit 130 sends send instructions to the field programmable gate array 140 based on the information indicative of the operability of the first DSL port 111-1 and the second DSL port 111-2.

If the first DSL port 111-1 and the second DSL port 111-2 are both operable, the field programmable gate array 140 directs every other one of the timeslots (such as timeslots 1, 3, 5, . . . , N represented generally by the numeral 210-1) to the first chipset 150-1 and the others of the every other one of the timeslots (such as timeslots 2, 4, 6, . . . , (N−1) represented generally by the numeral 210-2) to the second chipset 150-2 using the dual-pair-mode-time-slot mapping. The first chipset 150-1 and the second chipset 150-2 send the received timeslots 210-1 and 210-2 to the first DSL port 111-1 and the second DSL port 111-2, respectively, from which they are sent to the STU that is communicatively coupled via the digital subscriber lines 180-1 and 180-2, respectively.

The first chipset 150-1 and the second chipset 150-2 detect if either the respective first DSL port 111-1 or the second DSL port 111-2 is inoperable. If the first DSL port 111-1 or the second DSL port 111-2 is inoperable, the field programmable gate array 140 directs all the timeslots to the first chipset 150-1 and all the timeslots (such as 210-3 shown in FIG. 3) to the second chipset 150-2 using the 1+1 time-slot mapping. In this case, the chipset 150-1 or 150-2 that is coupled to the operable digital-subscriber-line port sends the received timeslots 210-3 to the communicatively coupled operable digital-subscriber-line port 111-1 or 111-2. The chipset 150-1 or 150-2 that is coupled to the inoperable digital-subscriber-line port does not send the received timeslots 210-3 to the communicatively coupled inoperable digital-subscriber-line port 111-1 or 111-2. In another implementation of this embodiment, the chipset 150-1 or 150-2 that is coupled to the inoperable digital-subscriber-line port sends the received timeslots 210-3 to the communicatively coupled inoperable digital-subscriber-line port 111-1 or 111-2 but it is not received at the other STU in the pair of STU since the port or line is inoperable.

FIG. 5 is a block diagram of a communication unit 325 operating in dual-pair mode while the communication units operate on the physical level in single pair mode in accordance with one embodiment of the present invention. The communication unit 325 is also referred to herein as STU 325. The STU 325 is representative of a remote STU (STU-R) and a central STU (STU-C). The communication unit 325 includes an Ethernet switch 120, the field programmable gate array (FPGA) 140, a central processing unit 130, and two G.SHDSL chipsets 350-1 and 350-2. The Ethernet switch 120 is communicatively coupled to the G.SHDSL port 310. The Ethernet switch 120 segments the Ethernet frame 200 into the plurality of timeslots (1-N) 210 and the field programmable gate array receives the timeslots 210 from the Ethernet switch 120. The field programmable gate array 140 directs each timeslot to one of the first-G.SHDSL port 311-1 and the second-G.SHDSL port 311-2 based on the operability of the first-G.SHDSL port 311-1 and the second-G.SHDSL port 311-2.

The central processing unit 130 receives information indicative of the operability of the first-G.SHDSL port 311-1 from the first G.SHDSL chipset 350-1. The central processing unit 130 also receives information indicative of the operability of the second G.SHDSL port 311-2 from the second G.SHDSL chipset 350-2. The central processing unit 130 sends send instructions to the field programmable gate array 140 based on the information indicative of the operability of the first-G.SHDSL port 311-1 and the second G.SHDSL port 311-2.

If the first-G.SHDSL port 311-1 and the second-G.SHDSL port 311-2 are both operable, the field programmable gate array 140 directs every other one of the timeslots (such as timeslots 210-1) to the first G.SHDSL chipset 350-1 and to the others of the every other one of the timeslots (such as timeslots 210-2) to the second G.SHDSL chipset 350-1 using the dual-pair-mode-time-slot mapping. The first G.SHDSL chipset 350-1 and the second G.SHDSL chipset 350-2 send the received timeslots 210-1 and 210-2 to the communicatively coupled to the first-G.SHDSL port 311-1 and the second-G.SHDSL port 311-2, respectively, where they are send to the STU that is communicatively coupled via the digital subscriber lines 180-1 and 180-2, respectively.

If either the first-G.SHDSL port 311-1 or the second-G.SHDSL port 311-2 is inoperable, the field programmable gate array 140 directs all the timeslots 210-3 (FIG. 2) to the first G.SHDSL chipset 350-1 and all the timeslots 210-3 to the second G.SHDSL chipset 350-2 using the 1+1 time-slot mapping. In this case, the chipset G.SHDSL 350-1 or 350-2 that is coupled to the operable digital-subscriber-line port sends the received timeslots 210-3 to the communicatively coupled operable digital-subscriber-line port 311-1 or 311-2. The G.SHDSL chipset 350-1 or 350-2 that is coupled to the inoperable digital-subscriber-line port does not send the received timeslots 210-3 to the communicatively coupled inoperable digital-subscriber-line port 311-1 or 311-2. In another implementation of this embodiment, the G.SHDSL chipset 350-1 or 350-2 that is coupled to the inoperable digital-subscriber-line port sends the received timeslots 210-3 to the communicatively coupled inoperable digital-subscriber-line port 311-1 or 311-2, but those timeslots 210-3 are not received at the other STU in the pair of STU on the inoperable line.

FIG. 6 is a block diagram of a communication system 11 operating in 1+1 mode sending Ethernet traffic across interfaces in accordance with one embodiment of the present invention. The "communication system 11" is also referred to herein as "digital subscriber line system 11." Communication system 11 includes a central SHDSL transceiver unit (STU-C) 327 that is communicatively coupled to a remote SHDSL transceiver unit (STU-R) 329 by a pair of digital subscriber lines 180. The central SHDSL transceiver unit 327 and the remote SHDSL transceiver unit 329 are similar in structure and function to the STU 325 described above with reference to FIG. 5. The central SHDSL transceiver unit 327 and the remote SHDSL transceiver unit 329 include the G.SHDSL interface port 310 and 312, the first-G.SHDSL port 311-1 and 313-1, and the second-G.SHDSL port 311-2 and 313-2, respectively. The central SHDSL transceiver unit 327 sends Ethernet data to and receives Ethernet data from the remote SHDSL transceiver unit 329 via the pair of digital subscriber lines 180. If one of the first-G.SHDSL port 311-1, the digital subscriber line 180-1, or the first-G.SHDSL port 313-1 fails, the communication on the respective first-G.SHDSL port 311-1 fails. Likewise, if one of the second-G.SHDSL port 311-2, the digital subscriber line 180-2, or the second-G.SHDSL port 313-2 fails, the communication on the second-G.SHDSL port 311-2 fails.

As shown in FIG. 6, a failure has been detected in the second-G.SHDSL port 311-2 communicatively coupled to the digital subscriber line 180-2 and all the data is sent in timeslots 210-3 over the digital subscriber line 180-1. The data rate over the digital subscriber line 180-1 is about half of what it would be if both digital subscriber lines 180-1 and 180-2 were operational. The remote SHDSL transceiver unit 329 receives the data in the timeslots 210-3 and forms the Ethernet frame 200 that is output from the G.SHDSL interface port 310. In this manner, the Ethernet data is not lost when one of the digital subscriber lines 180-1 or 180-2 in a pair of digital subscriber lines 180 experiences a failure. When a failed line is repaired and communication is restored, the SHDSL transceiver unit (such as central SHDSL transceiver unit 327 or remote SHDSL transceiver unit 329) that is sending the data switches from the 1+1 mode to the dual-pair mode. Specifically, the digital subscriber lines 180 are operated on the physical layer in single-pair mode and the field programmable gate array switches from 1+1 mapping to dual-pair-mode-time-slot mapping when the failed digital subscriber line is repaired.

Figure 7:
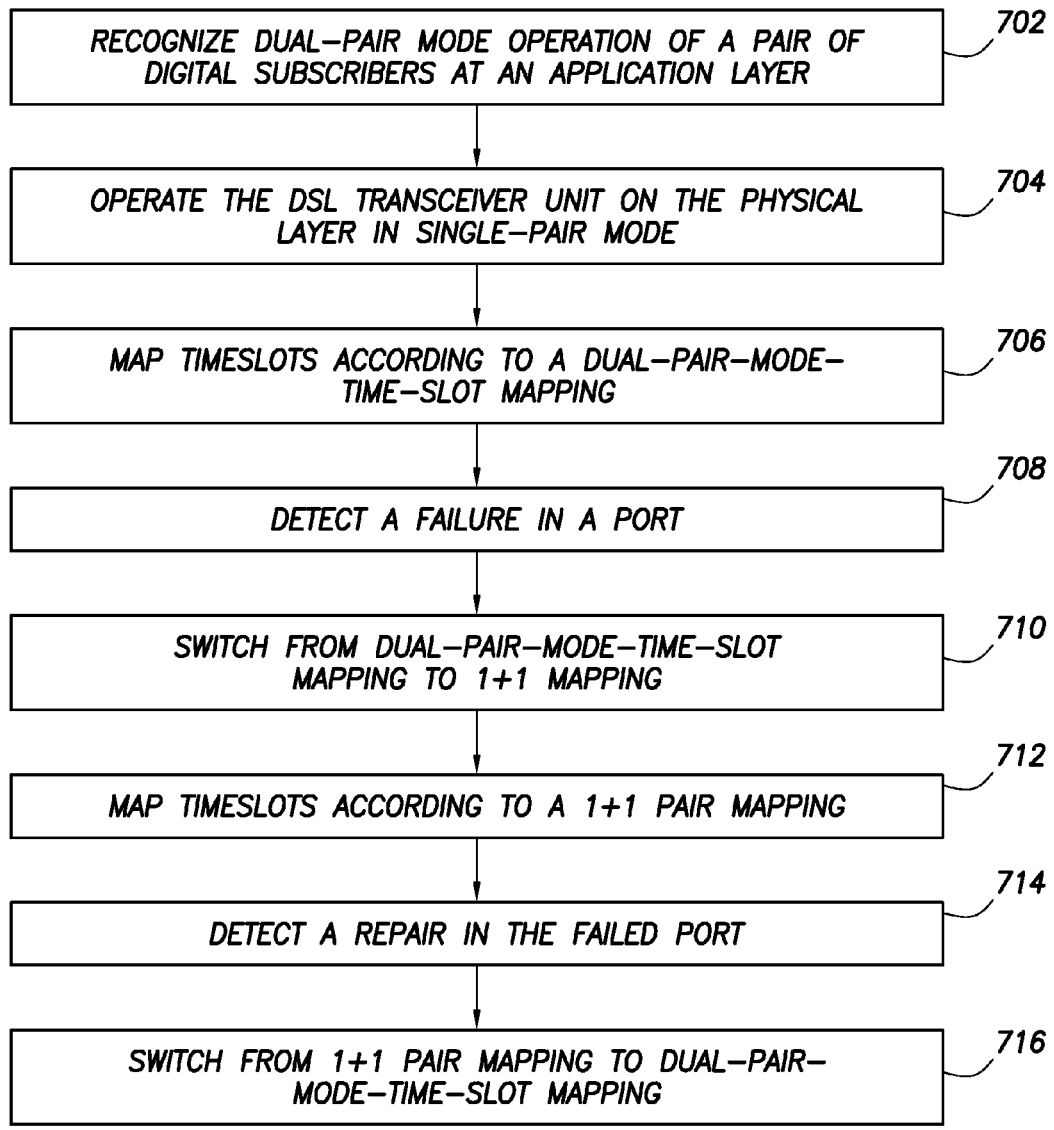
FIG. 7 is a flow diagram of one embodiment of a method to protect Ethernet data on a digital subscriber line system in accordance with one embodiment of the present invention.

FIG. 7 is a flow diagram of one embodiment of a method 700 to protect Ethernet data on a digital subscriber line system in accordance with one embodiment of the present invention. In one implementation of this embodiment, the method 700 is implemented on a communication system 10 operating in dual-pair mode sending Ethernet traffic across interfaces as described above with reference to FIGS. 1 and 2. In another implementation of this embodiment, the method 700 is implemented on a communication system 11 operating in dual-pair mode sending Ethernet traffic across interfaces as described above with reference to FIG. 6. In yet another implementation of this embodiment, the method 700 is implemented by a communication unit 300 sending timeslots in dual-pair mode as described above with reference to FIG. 4. In yet another implementation of this embodiment, the method 700 is implemented by a communication unit 325 sending timeslots in dual-pair mode as described above with reference to FIG. 5. It is to be understood that method 700 can be implemented using other embodiments of the virtual network.

At block 702, it is recognized at the application layer of a communication system that a SHDSL transceiver unit communicatively coupled to the pair of digital subscriber is operating in dual-pair mode. At block 704, the SHDSL transceiver unit operates on the physical layer in single-pair mode responsive to the application layer recognizing the dual-pair mode operation of a SHDSL transceiver unit. When the SHDSL transceiver unit is operating on the physical layer in single-pair mode, the SHDSL transceiver unit maps timeslots according to a dual-pair-mode-time-slot mapping if both lines in the pair of digital subscriber lines are operable and the SHDSL transceiver unit maps timeslots according to a 1+1 pair mapping if one of the lines in the pair of digital subscriber lines is inoperable.

At block 706, the SHDSL transceiver unit maps timeslots according to a dual-pair-mode-time-slot mapping. The dual-pair-mode-time-slot mapping is implemented since both lines in the digital subscriber line system are operable. Every other one of the timeslots are sent on one of the lines and the others of the timeslots are sent on the other line when the dual pair mode time-slot mapping is being implemented. In one implementation of this embodiment, the G.SHDSL transceiver unit maps timeslots according to a dual-pair-mode-time-slot mapping.

At block 708, a failure is detected in one of the DSL ports of the SHDSL transceiver unit. The DSL chipset that is monitoring the health of the lines in the digital subscriber line system detects the failure and sends information indicative of the failure to a processing unit that is communicatively coupled to the chipset that detects the failure. In one implementation of this embodiment, a failure is detected in one of the G.SHDSL ports in a G.SHDSL transceiver unit. In this case, the G.SHDSL chipset monitors the health of the lines in the digital subscriber line system, detects the failure, and sends information indicative of the failure to the processing unit that is communicatively coupled to the G.SHDSL chipset that detects the failure.

At block 710, the SHDSL transceiver unit switches from dual-pair-mode-time-slot mapping to 1+1 time-slot mapping responsive to the detecting of the fault on the line in the pair of digital subscriber lines. In one implementation of this embodiment, the SHDSL transceiver unit is a G.SHDSL transceiver unit. At block 712, the SHDSL transceiver unit maps timeslots according to a 1+1 pair mapping. The mapping is implemented by an FPGA that is communicatively coupled to the central processing unit. All the timeslots are sent to both of the lines when the 1+1 time-slot mapping is being implemented.

At block 714, a repair is detected by the SHDSL chipset in the failed SHDSL port of the SHDSL transceiver unit. In one implementation of this embodiment, a repair is detected by the G.SHDSL chipset in the failed G.SHDSL port of the G.SHDSL transceiver unit.

At block 716, SHDSL transceiver unit switches from 1+1 time-slot mapping to dual-pair-mode-time-slot mapping when the fault is corrected and when both of the lines in the in the pair of digital subscriber lines are determined to be operable. The lines in the in the pair of digital subscriber lines are determined to be operable based on the detected repair at block 714.

Figure 8:
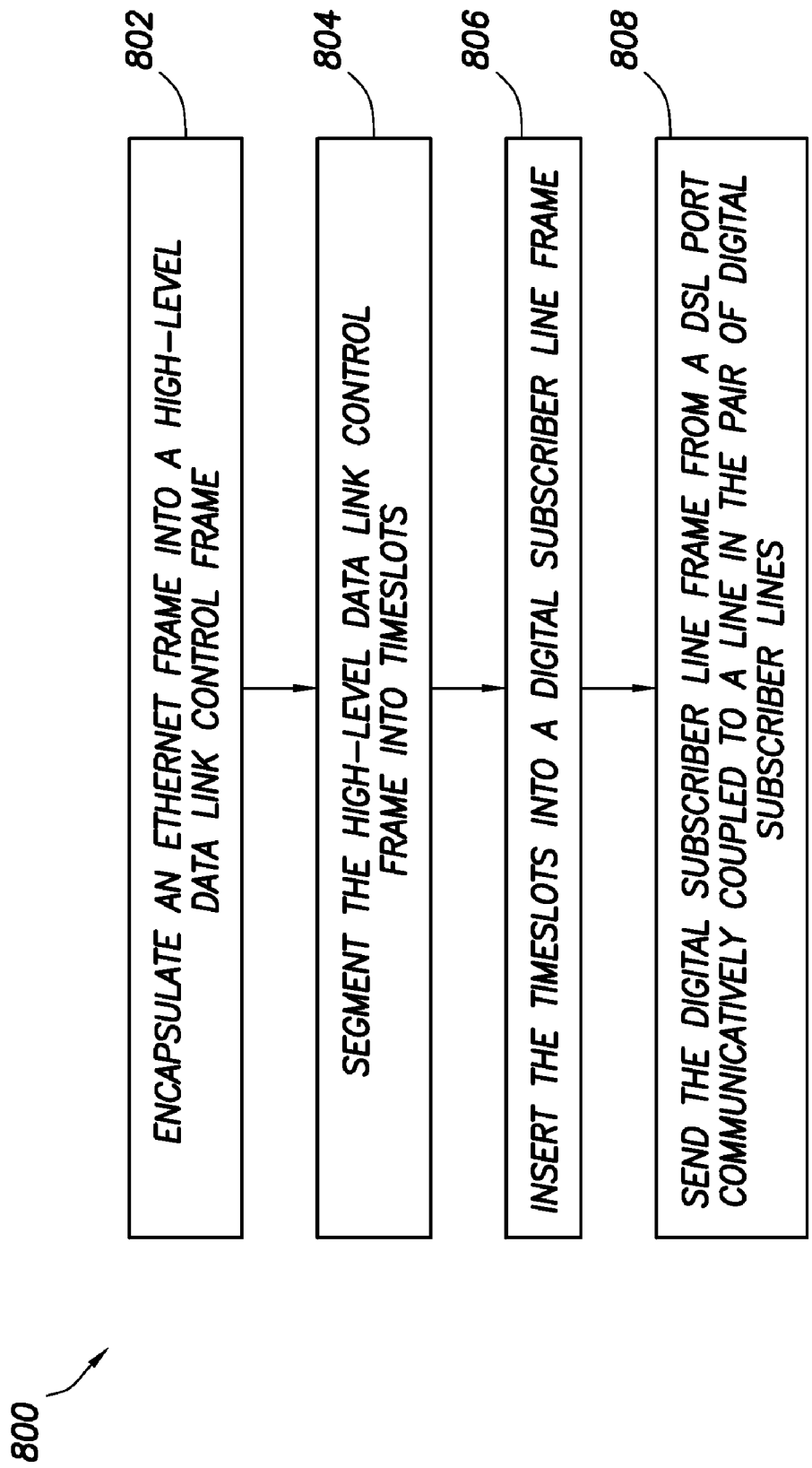
FIG. 8 is a flow diagram of one embodiment of a method to modify Ethernet frames in accordance with one embodiment of the present invention.

FIG. 8 is a flow diagram of one embodiment of a method 800 to modify Ethernet frames in accordance with one embodiment of the present invention. In one implementation of this embodiment, the method 800 is implemented within a communication system 10 operating in dual-pair mode sending Ethernet traffic across interfaces as described above with reference to FIGS. 1 and 2. In another implementation of this embodiment, the method 800 is implemented within a communication system 11 operating in dual-pair mode sending Ethernet traffic across interfaces as described above with reference to FIG. 6.

At block 802, the Ethernet frame is encapsulated into a high-level data link control frame. At block 804, the high-level data link control frame is segmented into timeslots. At block 806, the timeslots are inserted into a digital subscriber line frame. At block 808, the digital subscriber line frame is sent from a G.SHDSL port communicatively coupled to a line in the in the pair of digital subscriber lines. In one implementation of this embodiment, the digital subscriber line frame is sent from a DSL port communicatively coupled to a line in the in the pair of digital subscriber lines.

The central processing unit 130 executes software and/or firmware that causes the central processing unit 130 to perform at least some of the processing described here as being performed by the communication unit 300. At least a portion of such software and/or firmware executed by the central processing unit 130 and any related data structures are stored in storage medium during execution. In one implementation of this embodiment, the central processing unit 130 includes a memory. Memory comprises any suitable memory now known or later developed such as, for example, random access memory (RAM), read only memory (ROM), and/or registers within the central processing unit 130. In one implementation, the central processing unit 130 comprises a microprocessor or microcontroller. The software and/or firmware executed by the central processing unit 130 comprises a plurality of program instructions that are stored or otherwise embodied on a storage medium from which at least a portion of such program instructions are read for execution by the central processing unit 130. In one implementation, the central processing unit 130 comprises processor support chips and/or system support chips such as ASICs.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

We claim:

1. A communication system comprising:
at least one communication unit, each communication unit including,
an interface port;
a first-digital-subscriber-line port;
a second-digital-subscriber-line port; and
a central processing unit communicatively coupled to receive information indicative of the operability of the first-digital-subscriber-line port and the second -digital-subscriber-line port,
wherein the at least one communication unit is implemented on the physical layer in single-pair mode, and wherein the at least one communication unit is configured to switch from sending timeslots in dual-pair mode to sending timeslots in 1+1 protection mode when communication on one of the first-digital-subscriber-line port and the second-digital-subscriber-line port fails.

2. The communication system of claim 1, wherein the at least one communication unit further comprises:
an Ethernet switch communicatively coupled to the at least one interface port, the Ethernet switch operable to segment an Ethernet frame into a plurality of timeslots; and
a field programmable gate array communicatively coupled to receive the timeslots from the Ethernet switch, the field programmable gate array operable to direct each timeslot to one of the first-digital-subscriber-line port, the second-digital-subscriber-line port, or both the first and second-digital-subscriber-line ports based on the operability of the first-digital-subscriber-line port and the second-digital-subscriber-line port.

3. The communication system of claim 2, wherein the at least one communication unit further comprises:
a first chipset configured to monitor the first-digital-subscriber-line port; and
a second chipset configured to monitor the second-digital-subscriber-line port;
wherein the central processing unit is configured to receive information indicative of the operability of the first-digital-subscriber-line port from the first chipset, configured to receive information indicative of the operability of the second-digital-subscriber-line port from the second chipset, and configured to send instructions to the field programmable gate array based on the information indicative of the operability of the first-digital-subscriber-line port and the second-digital-subscriber-line port.

4. The communication system of claim 1, wherein the at least one interface port is a G.SHDSL interface port.

5. The communication system of claim 1, wherein the first-digital-subscriber-line port comprises a first G.SHDSL port and the second-digital-subscriber-line port comprises a second G.SHDSL port, and wherein the at least one communication unit further comprises:
an Ethernet switch communicatively coupled to the at least one interface port, the Ethernet switch operable to segment an Ethernet frame into a plurality of timeslots; and
a field programmable gate array communicatively coupled to receive the timeslots from the Ethernet switch, the field programmable gate array operable to direct each timeslot to one of the first G.SHDSL port, the second G.SHDSL port, or both the first and second G.SHDSL port based on the operability of the first G.SHDSL port and the second G.SHDSL port.

6. The communication system of claim 5, wherein the at least one communication unit further comprises:
a first G.SHDSL chipset configured to monitor the first G.SHDSL port; and
a second G.SHDSL chipset configured to monitor the second G.SHDSL port,
wherein the central processing unit is configured to receive information indicative of the operability of the first G.SHDSL port from the first G.SHDSL chipset, configured to receive information indicative of the operability of the second G.SHDSL port from the second G.SHDSL chipset, and configured to send instructions to the field programmable gate array based on the information indicative of the operability of the first G.SHDSL port and the second G.SHDSL port.

7. The communication system of claim 1, wherein at least one communication unit includes,
   a central SHDSL transceiver unit operating on the physical layer in single-pair mode, the central SHDSL transceiver unit configured to send and receive Ethernet frames via the at least one interface port, the first-digital-subscriber-line port, and the second-digital -subscriber-line port; and
   a remote SHDSL transceiver unit operating on the physical layer in single-pair mode, the remote SHDSL transceiver unit configured to send and receive Ethernet frames via the at least one interface port, the first-digital-subscriber-line port, and the second- digital -subscriber-line port, wherein the remote SHDSL transceiver unit is communicatively coupled to the central SHDSL transceiver unit by a pair of digital subscriber lines.

8. The communication system of claim 7, wherein the first-digital -subscriber-line ports and the second-digital-subscriber-line ports respectively comprise first G.SHDSL ports and second G.SHDSL ports, and wherein the central SHDSL transceiver unit and the remote SHDSL transceiver unit each further comprise:
   an Ethernet switch communicatively coupled to the at least one interface port, the Ethernet switch operable to segment the Ethernet frame into a plurality of timeslots; and
   a field programmable gate array communicatively coupled to receive the timeslots from the Ethernet switch, the field programmable gate array operable to direct each timeslot to one of the first G.SHDSL port, the second G.SHDSL port, or both the first and second G.SHDSL port based on the operability of the first G.SHDSL port and the second G.SHDSL port.

9. The communication system of claim 8, wherein the central SHDSL transceiver unit and the remote SHDSL transceiver unit each further comprise:
   a first G.SHDSL chipset configured to monitor the first G.SHDSL port; and
   a second G.SHDSL chipset configured to monitor the second G.SHDSL port,
   wherein the central processing unit is configured to receive information indicative of the operability of the first G.SHDSL port of the first G.SHDSL port from the first G.SHDSL chipset, configured to receive information indicative of the operability of the second G.SHDSL port from the second G.SHDSL chipset, and configured to send instructions to the field programmable gate array based on the information indicative of the operability of the first G.SHDSL port and the second G.SHDSL port.

10. The communication system of claim 7, further comprising a pair of digital subscriber lines communicatively coupling the central SHDSL transceiver unit to the remote SHDSL transceiver unit.

11. The communication system of claim 1, wherein the at least one communication unit is configured to switch from sending timeslots in 1+1 protection mode to sending timeslots in dual-pair mode when communication is restored on the failed one of the first-digital-subscriber-line port and the second-digital-subscriber-line port.

12. A method to protect Ethernet data on a digital subscriber line system, the method comprising:
    switching from dual-pair-mode-time-slot mapping to 1+1 time-slot mapping when a fault is detected on a line in a pair of digital subscriber lines; and switching from 1+1 time-slot mapping t dual-pair-mode-time slot mapping when the fault is corrected.

13. The method of claim 12, further comprising:
    recognizing dual-pair mode operation of a SHDSL transceiver unit communicatively coupled to the pair of digital subscriber lines at an application layer; and
    operating the SHDSL transceiver unit on the physical layer in single-pair mode responsive to recognizing the dual-pair mode operation of a SHDSL transceiver unit communicatively coupled to the pair of digital subscriber lines.

14. The method of claim 13, wherein operating the SHDSL transceiver unit on the physical layer in single-pair mode comprises mapping timeslots according to a dual-pair-mode-time-slot mapping when the lines in the pair of digital subscriber lines are operable.

15. The method of claim 14, wherein operating the SHDSL transceiver unit on the physical layer in single-pair mode further comprises mapping timeslots according to a 1+1 pair mapping when one of the lines in the pair of digital subscriber lines is inoperable.

16. The method of claim 12, further comprising:
    encapsulating an Ethernet frame into a high-level data link control frame;
    segmenting the high-level data link control frame into timeslots;
    inserting the timeslots into a digital subscriber line frame; and
    sending the frame from a G.SHDSL port communicatively coupled to a line in the in the pair of digital subscriber lines.

17. The method of claim 12, further comprising:
    detecting a failure in one of the G.SHDSL ports.

18. A method to protect Ethernet data on a digital subscriber line system, the method comprising:
    mapping timeslots according to a dual-pair-mode-time-slot mapping when lines in the digital subscriber line system are operable;
    switching from dual-pair-mode-time-slot mapping to 1+1 mapping when one of the lines in the pair of digital subscriber lines is determined to be inoperable; and
    mapping timeslots according to a 1+1 pair mapping when one of the lines in the pair of digital subscriber lines is inoperable.

19. The method of claim 18, further comprising:
    switching from 1+1 pair mapping to dual-pair-mode-time-slot mapping when both of the lines in the in the pair of digital subscriber lines are determined to be operable.

20. The method of claim 18, further comprising:
    encapsulating Ethernet frames into high-level data link control frames;
    segmenting the high-level data link control frames into timeslots;
    inserting the timeslots into a digital subscriber line frame; and
    sending the digital subscriber line frame from a G.SHDSL port communicatively coupled to a line in the in the pair of digital subscriber lines.

21. The method of claim 18, further comprising detecting a failure in a G.SHDSL port.

22. The method of claim 18, further comprising:
    recognizing dual-pair mode operation of a SHDSL transceiver unit in the digital subscriber line system; and
    operating the SHDSL transceiver unit on the physical layer in single-pair mode responsive to recognizing the dual-pair mode operation of the SHDSL transceiver unit.

23. A communication unit comprising:
- at least one interface port configured to send and receive Ethernet frames;
- a first port communicatively coupled to a first line in a pair of digital subscriber lines;
- a second port communicatively coupled to a second line in a pair of digital subscriber lines;
- a first chipset configured to monitor the first port;
- a second chipset configured to monitor the second port; and
- a central processing unit configured to receive information indicative of the operability of the first port from the first chipset, configured to receive information indicative of the operability of the second port from the second chipset, and configured to send instructions to a field programmable gate array based on the information indicative of the operability of the first port and the second port, wherein the communication unit operates on the physical layer in single-pair mode wherein Ethernet data is not lost when one of the first port and the second port is inoperable.

24. The communication unit of claim 23, wherein the
- first port is a first G.SHDSL port;
- the second port is a second G.SHDSL port;
- the first chipset is a first G.SHDSL chipset; and
- the second chipset is a second G.SHDSL chipset.

25. The communication unit of claim 24, further comprising:
- the field programmable gate array configured to map a plurality of timeslots according to a dual-pair-mode-time-slot mapping when the first and second G.SHDSL ports are operable, and configured to map a plurality of timeslots according to a 1+1 time-slot mapping when one of the first ports or second port is inoperable.

26. The communication unit of claim 25, further comprising:
- an Ethernet switch communicatively coupled to the at least one interface port, the Ethernet switch operable to segment an Ethernet frame into the plurality of timeslots, and wherein the field programmable gate array is communicatively coupled to receive the timeslots from the Ethernet switch.

27. A communication system comprising:
- at least one communication unit, each communication unit including,
  - an interface port;
  - a symmetric first-digital-subscriber-line port;
  - a symmetric second-digital-subscriber-line port; and
  - a central processing unit communicatively coupled to receive information indicative of the operability of the first-digital-subscriber-line port and the second-digital-subscriber-line port,
- wherein the at least one communication unit is implemented on the physical layer in single-pair mode, and wherein the at least one communication unit is configured to switch from sending timeslots in dual-pair mode to sending timeslots in 1+1 protection mode when communication on one of the first-digital-subscriber-line port and the second-digital-subscriber-line port fails.

* * * * *